United States Patent
Kinnaird et al.

(10) Patent No.: US 11,651,360 B2
(45) Date of Patent: May 16, 2023

(54) TRIGGERING ACTIONS RESPONSIVE TO BLOCKCHAIN TRANSACTIONS

(71) Applicant: Kyndryl, Inc., New York, NY (US)

(72) Inventors: Douglas G. Kinnaird, Calgary (CA); Ruiping Li, San Jose, CA (US); Brian M. O'Connell, Cary, NC (US); Susan K. Schreitmueller, Irving, TX (US); Shelbee D. Smith-Eigenbrode, Thornton, CO (US); David D. Weck, Santa Rosa Beach, CA (US)

(73) Assignee: Kyndryl, Inc., New York, NY (US)

( * ) Notice: Subject to any disclaimer, the term of this patent is extended or adjusted under 35 U.S.C. 154(b) by 667 days.

(21) Appl. No.: 15/357,313

(22) Filed: Nov. 21, 2016

(65) Prior Publication Data

US 2018/0144340 A1 May 24, 2018

(51) Int. Cl.
  *G06Q 20/38* (2012.01)
  *G06Q 20/06* (2012.01)
  *H04L 67/10* (2022.01)

(52) U.S. Cl.
  CPC ....... *G06Q 20/3829* (2013.01); *G06Q 20/065* (2013.01); *H04L 67/10* (2013.01); *G06Q 2220/00* (2013.01); *H04L 2209/56* (2013.01)

(58) Field of Classification Search
  CPC ............. G06Q 20/3829; G06Q 20/065; G06Q 2220/00; H04L 9/3236; H04L 67/10; H04L 2209/38; H04L 2209/56
  See application file for complete search history.

(56) References Cited

U.S. PATENT DOCUMENTS

| 10,341,309 | B1* | 7/2019 | Ramirez | H04L 67/12 |
|---|---|---|---|---|
| 2013/0282454 | A1* | 10/2013 | Alpert | G06Q 30/0209 705/14.12 |
| 2015/0120567 | A1 | 4/2015 | Van Rooyen et al. | |
| 2015/0269570 | A1 | 9/2015 | Phan et al. | |
| 2015/0278820 | A1 | 10/2015 | Meadows | |
| 2015/0302400 | A1 | 10/2015 | Metral | |
| 2015/0332283 | A1* | 11/2015 | Witchey | H04W 12/02 705/3 |
| 2015/0379510 | A1* | 12/2015 | Smith | H04L 9/3242 705/71 |
| 2016/0012424 | A1* | 1/2016 | Simon | G06Q 20/3829 705/67 |

(Continued)

OTHER PUBLICATIONS

"Ekblaw et al., "A Case Study for Blockchain in Healthcare: "MedRec" prototype for electronic health records and medical research data", Aug. 2016, IEEE, Open & Big Data Conference, Aug. 22-24, 2016" (Year: 2016).*

(Continued)

*Primary Examiner* — Courtney P Jones (57) ABSTRACT

A blockchain may store transactions for various purposes which may be later accessed by interested parties for ledger verification. One example method of operation may comprise one or more of receiving a blockchain transaction, identifying a proof-of-work is generated for the blockchain transaction via a network entity, transmitting the proof-of-work and a select portion of ledger data to a registered third party via an encrypted message based on a third party key, validating the proof-of-work via the third party, and providing a reward to the network entity.

11 Claims, 7 Drawing Sheets

(56) References Cited

U.S. PATENT DOCUMENTS

| | | | |
|---|---|---|---|
| 2016/0086175 A1 | 3/2016 | Finlow-Bates et al. | |
| 2016/0140653 A1 | 5/2016 | McKenzie | |
| 2016/0203522 A1 | 7/2016 | Shiffert et al. | |
| 2016/0218879 A1 | 7/2016 | Ferrin | |
| 2016/0261404 A1* | 9/2016 | Ford | H04L 67/104 |
| 2016/0292672 A1* | 10/2016 | Fay | G06Q 20/363 |
| 2016/0328713 A1* | 11/2016 | Ebrahimi | H04L 9/14 |
| 2016/0379256 A1* | 12/2016 | Salamon | G06Q 30/0255 |
| | | | 705/14.53 |
| 2017/0046638 A1* | 2/2017 | Chan | G06F 21/62 |
| 2017/0148016 A1* | 5/2017 | Davis | G06Q 20/3827 |
| 2017/0195747 A1* | 7/2017 | Haberman | H04N 21/858 |
| 2017/0249623 A1* | 8/2017 | Cole | G06Q 30/0277 |
| 2017/0322992 A1* | 11/2017 | Joseph | G06F 16/27 |
| 2017/0352033 A1* | 12/2017 | Buckman | G06Q 20/401 |
| 2017/0352116 A1* | 12/2017 | Pierce | H04L 63/10 |
| 2018/0089655 A1* | 3/2018 | McDonald | G06Q 20/02 |
| 2018/0091596 A1* | 3/2018 | Alvarez | H04L 67/12 |
| 2018/0109541 A1* | 4/2018 | Gleichauf | H04W 12/10 |
| 2018/0205555 A1* | 7/2018 | Watanabe | H04L 9/3236 |
| 2018/0308134 A1* | 10/2018 | Manning | G06Q 30/0275 |
| 2020/0410488 A1* | 12/2020 | Srinivasan | G06F 21/64 |

OTHER PUBLICATIONS

Mainelli, M., & Smith, M. (2015). Sharing ledgers for sharing economies: an exploration of mutual distributed ledgers (aka blockchain technology). The Journal of Financial Perspectives, 3(3), 38-69. See highlighted sections.

Palomar, E., Estevez-Tapiador, J. M., Hernandez-Castro, J. C., & Ribagorda, A. (2006). A protocol for secure content distribution in pure p2p networks. In 17th International Workshop on Database and Expert Systems Applications (DEXA'06), 712-716. See highlighted sections.

Joshua A. Kroll, The Economics of Bitcoin Mining, or Bitcoin in the Presence of Adversaries, The Twelfth Workshop on the Economics of Information Security, Jun. 11-12, 2013.

Arthur Gervais, On the Security and Performance of Proof of Work Blockchains, 2009.

Iddo Bentov, Proof of Activity: Extending Bitcoin's Proof of Work via Proof of Stake, European Community's Seventh Framework Programme (FP7/2007-2013).

* cited by examiner

TRIGGERING ACTIONS RESPONSIVE TO BLOCKCHAIN TRANSACTIONS

TECHNICAL FIELD

This application relates to actions being triggered from a blockchain, and more particularly, to having certain operations performed as transactions are received and/or stored in a blockchain.

BACKGROUND

Blockchain uses a proof-of-work scheme to verify transactions via various nodes on a network. The proof-of-work is generally rewarded by a reward scheme associated with the blockchain. For example, a miner or verifier of a cryptocurrency can verify transactions for accuracy and will be rewarded for completing such an effort. When incentivizing these efforts, including proof-of-work efforts, a reward is generally paid by an initiator of the transaction(s).

In known blockchain systems, a global ledger is modified via systems that record transactions using a proof-of-work. Systems compete to be the first to solve the proof-of-work puzzle and are then provided a blockchain reward. In some systems, these rewards are a creation of additional currency and/or transaction fees (tips). To expand the scope of blockchain systems outside the scope of financial services, the transaction fee model may be amended to provide alternate avenues to incentivize proof-of-work systems.

SUMMARY

One example embodiment may provide a method that comprises one or more of receiving a blockchain transaction, identifying a proof-of-work is generated for the blockchain transaction via a network entity, transmitting the proof-of-work and a select portion of ledger data to a registered third party via an encrypted message based on a third party key, validating the proof-of-work via the third party, and providing a reward to the network entity.

Another example embodiment may provide an apparatus that comprises a receiver configured to receive a blockchain transaction, and a processor configured to perform at least one of identify a proof-of-work is generated for the blockchain transaction via a network entity, transmit the proof-of-work and a select portion of ledger data to a registered third party via an encrypted message based on a third party key, validate the proof-of-work via the third party, and provide a reward to the network entity.

Still another example embodiment may include a non-transitory computer readable storage medium configured to store instructions that when executed cause a processor to perform one or more of receiving a blockchain transaction, identifying a proof-of-work is generated for the blockchain transaction via a network entity, transmitting the proof-of-work and a select portion of ledger data to a registered third party via an encrypted message based on a third party key, validating the proof-of-work via the third party, and providing a reward to the network entity.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide third parties with the capability to reward proof-of-work systems engaged in validating blockchain transactions. Additionally, the example embodiments enable new business models, such as targeted advertising and alerts/notifications based on blockchain transactions. Example embodiments provide incentives for proof-of-work systems to engage in blockchain systems outside of financial realms, reduce or eliminate cost to initiators of blockchain transactions, and the ability to perform targeted advertising or other notifications during blockchain transactions. Other features of the example embodiments provide rewards for proof-of-work systems through selectively triggering actions via exchanged information during blockchain transactions where the rewards and triggers are not derived from an initiator of the transactions. The third parties may 'piggy-back' on or provide incentives as an add-on to conventional blockchain transactions without enabling third parties to reward proof-of-work systems engaged in validating blockchain transactions.

By designating a third party public key, a reward can be provided to the proof-of-work system for the sharing of a specific ledger entry. A proof-of-work system supports the partial or full transfer of ledger data or metadata to a third party as well as the inclusion of a notification to be returned to the originating party of the ledger transaction. This is performed so the third party has knowledge of what sort of notification to send, for example, to provide a notification for advertisement. The notification is encrypted/signed with the third party encryption (public key) so that the originating party can validate who created the notification.

By generating a proof-of-work using elements of the ledger except an optional return notification to the originating party, the completed proof-of-work to the third-party system along with selected ledger data/metadata for validating the proof-of-work is sent and the data/metadata is processed. Thereafter, the third party may return a notification/metadata with an agreement to remit payment once the transaction is added to the blockchain. The ledger entry may be amended with the notification. It is not a requirement that the third party performs the proof-of work. However, the third party may be providing payment to the miners performing the proof-of work in exchange for being able to provide notification/advertisements. Depending on the design of the blockchain, the metadata may contain information about the blocks. The blocks may contain information about an object, for example an odometer reading of a vehicle, and the metadata may contain owner information, etc.

Figure 1A:
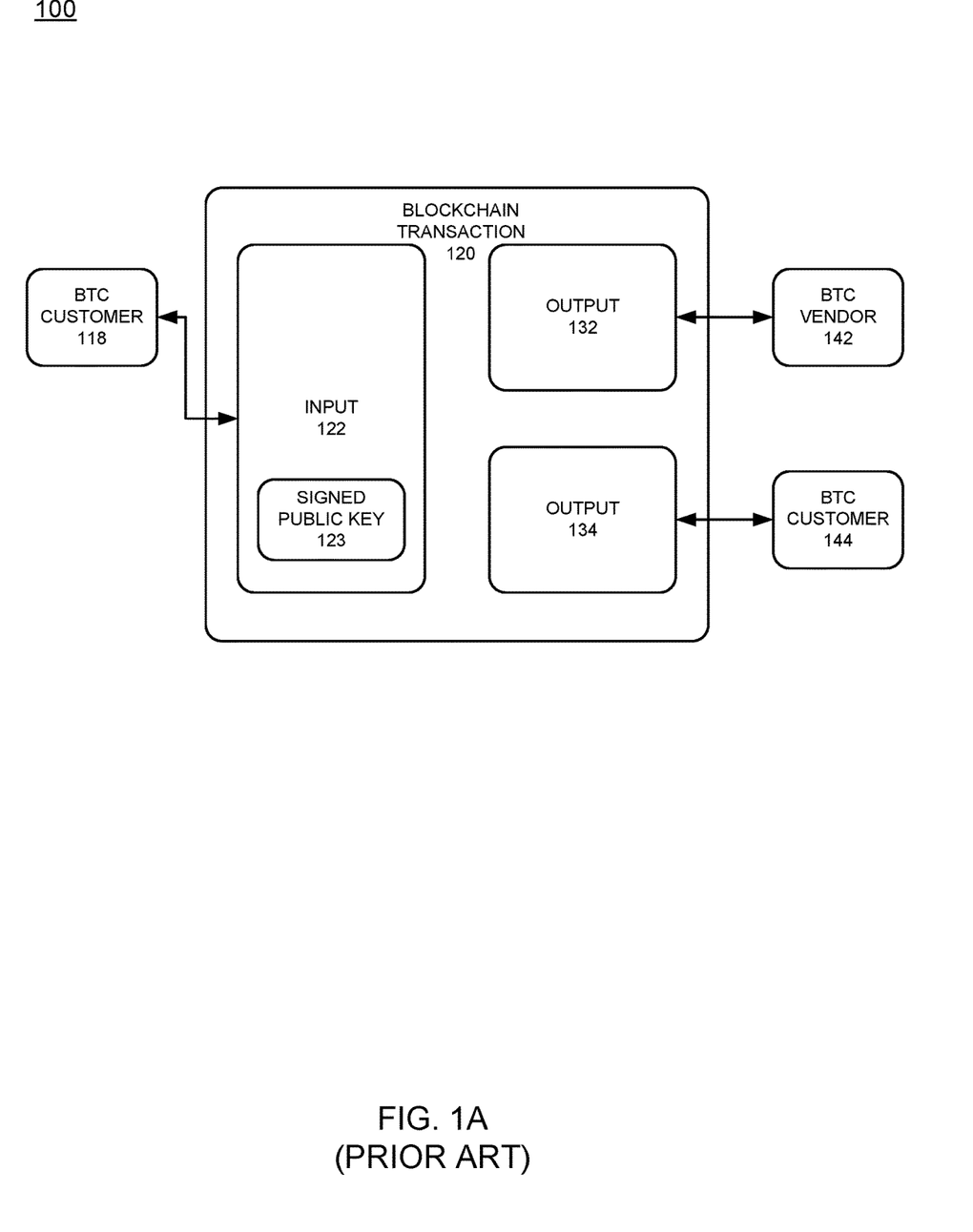
FIG. 1A illustrates a conventional approach to performing a blockchain ledger entry.

FIG. 1A illustrates a conventional approach to performing a blockchain ledger entry. Referring to FIG. 1A, the blockchain transaction process 100 includes modifying a global ledger by nodes that solve proof-of-work problems and then receive a reward, such as an amount of crypto-currency. For example, a customer 118 (who can be a BTC or BITCOIN customer) can pay an amount, for example five BTC to the input module 122 of a blockchain transaction 120. The input module 122 may have a signed public key 123. The output may include one or more outputs, for example output 132 (that provides two BTC being provided to a vendor 142) and output 134 (that provides three BTC being provided to a customer 144). FIG. 1A depicts a typical blockchain ledger for financial purposes in which an amount of bitcoin is sent to a vendor and any additional amount is returned to the originator.

Figure 1B:
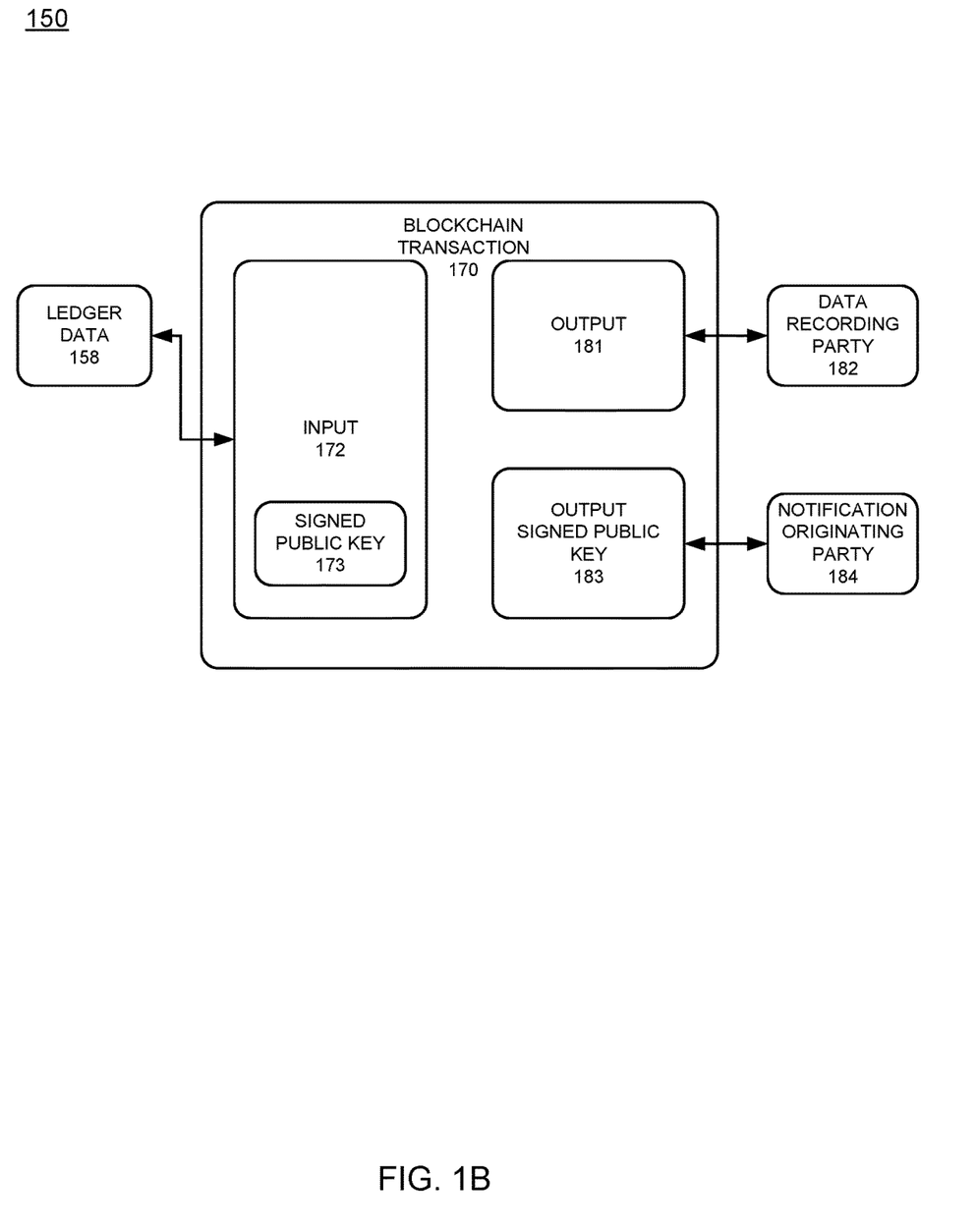
FIG. 1B illustrates performing a blockchain ledger entry according to example embodiments.

FIG. 1B illustrates performing a blockchain ledger entry according to example embodiments. Referring to FIG. 1B, in the approach 150 includes a modified proof-of-work system to support a partial or full transfer of ledger data or metadata to a third party as well as an inclusion of a notification to be returned to the originating party of the blockchain transaction 170. A standard proof-of-work is generated using all elements of a ledger in the blockchain, however in one embodiment, an optional return notification is sent to the originating party. The ledger data 158 is provided to an input 172 and a signed public key is generated 173. Once the proof-of-work is completed, it is output 181 to a third-party 182 along with selected ledger data/meta-data. The third-party 182 performs one or more of: validates the proof-of-work, processes the data/metadata, returns a notification and agrees to remit payment once the chain is added to the blockchain. The notification may be encrypted with the originating party's public key 183. The ledger entry is amended with the notification which is sent to the originating party 184.

Figure 2A:
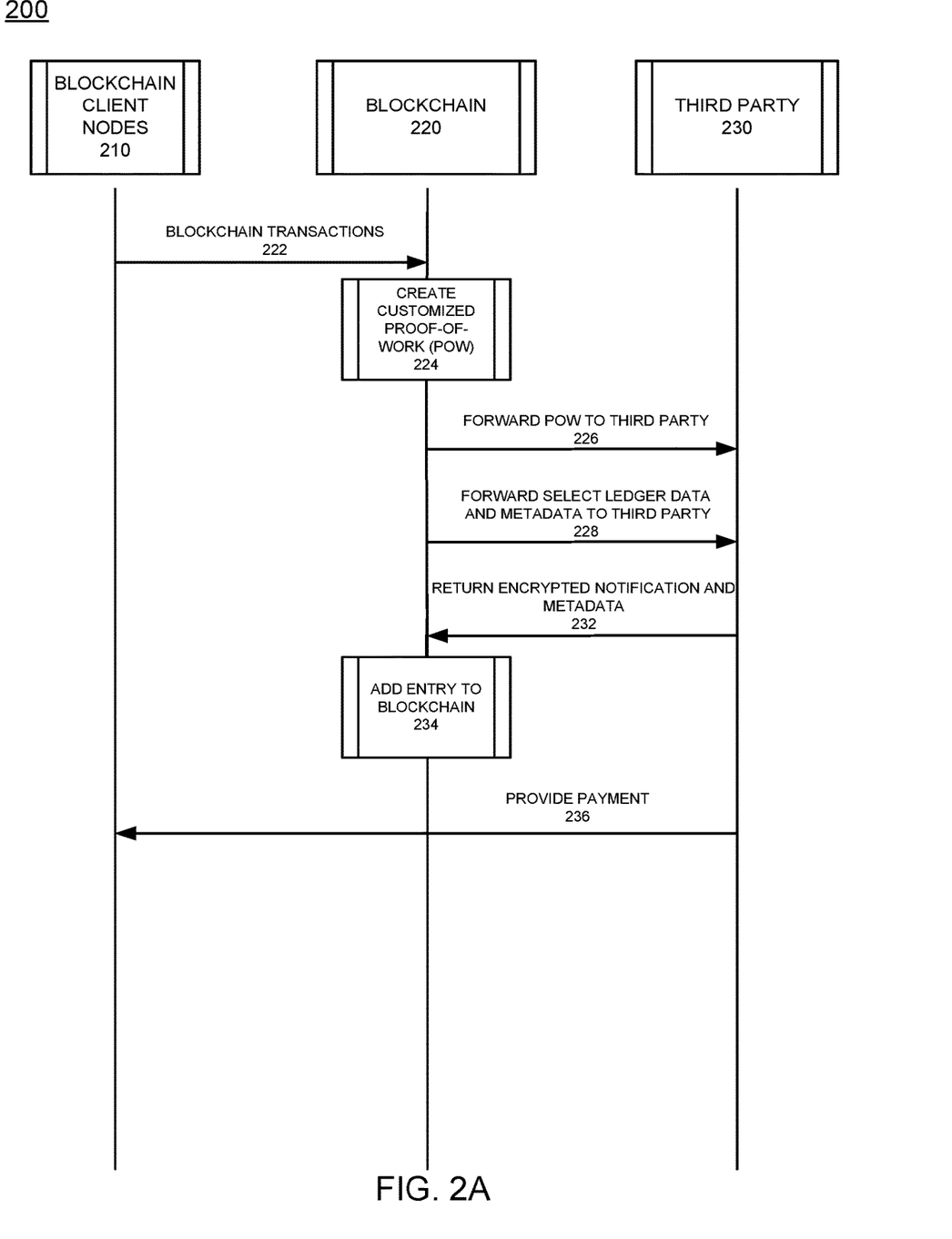
FIG. 2A illustrates a system signaling diagram of a blockchain transaction configuration with a third party according to example embodiments.

FIG. 2A illustrates a system signaling diagram of a blockchain transaction configuration with a third party according to example embodiments. Referring to FIG. 2A, the system 200 includes a blockchain client node(s) 210, a blockchain 220 and a third party 230. In operation, as blockchain transactions 222 are received, a customized proof-of-work may be created 224 to include no return notification to the originating party. Instead, the proof-of-work may identify the third party 230 that is going to reward the proof-of-work verifiers. In this example, the proof-of-work is forwarded to the third party 226 along with select ledger data and metadata 228. The third party 230 validates the proof-of-work and returns the encrypted notification and metadata 232 to the blockchain 220 along with an agreement to remit payment once the transaction is added to the blockchain. The notification may be encrypted with the originating party's public key. The ledger entry is amended with the notification 234 and payment is provided 236 to the appropriate blockchain nodes 210. The third party 230 can then generate and/or return a notification that is sent to a user device.

Figure 2B:
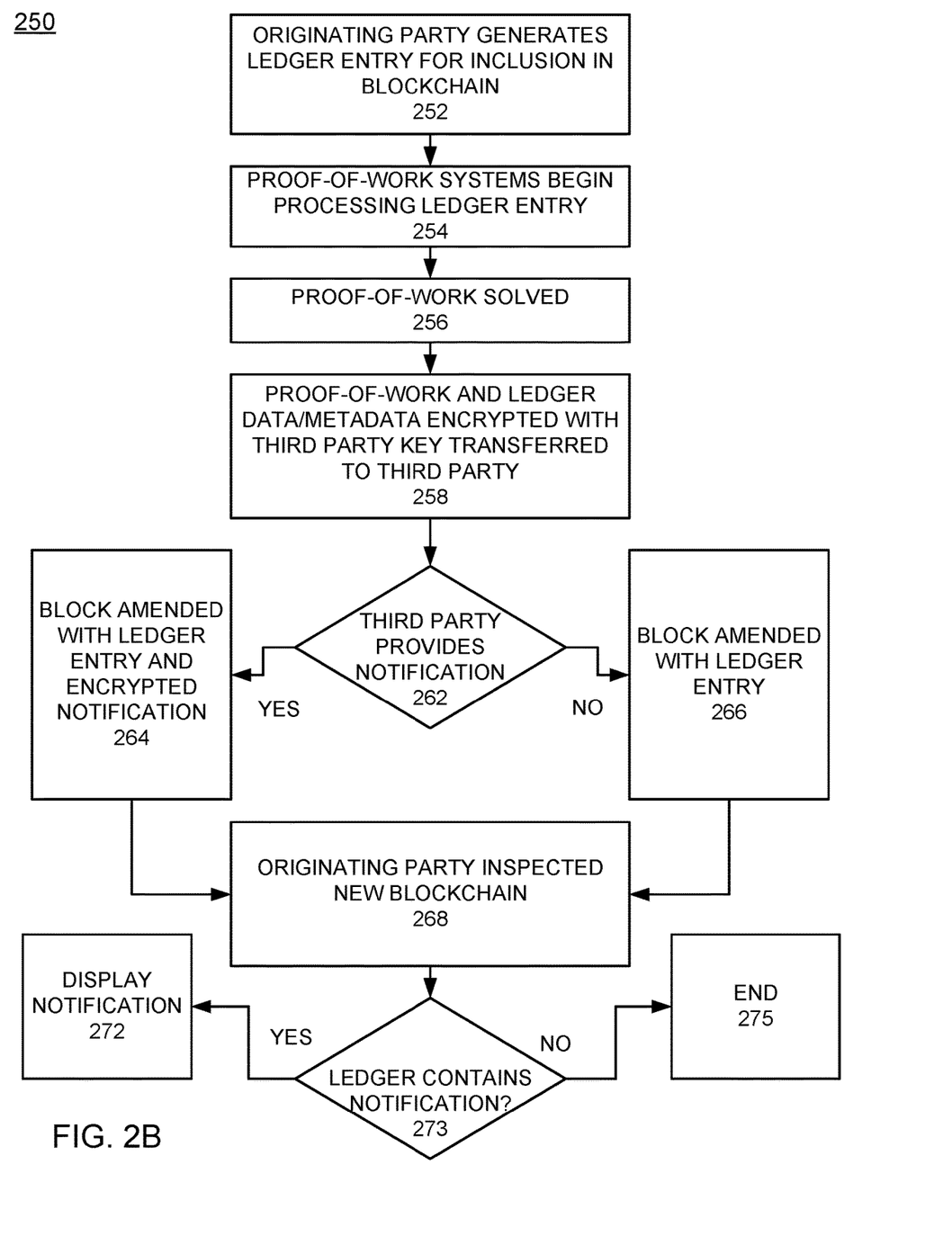
FIG. 2B illustrates a flow diagram of a blockchain transaction configuration with a third party according to example embodiments.

FIG. 2B illustrates a flow diagram of a blockchain transaction configuration with a third party according to example embodiments. Referring to FIG. 2B, the process 250 comprises an originating party generating a ledger entry for inclusion in a blockchain 252. A proof-of-work is processed for the new entry 254 and is solved 256. The proof-of-work and the ledger data/metadata are encrypted with a third party key that is transferred to the third party 258. If the third party provides the notification 262 then the block is amended with the ledger entry and the encrypted notification 264. If not, then the block is amended with the ledger entry and not the notification 266. An originating party is inspected with a new blockchain 268 and it is determined if the ledger contains the notification 273. If so, a notification is displayed 272 and if not, the process ends 275.

Traditional blockchain ledgers may be augmented to enable the instant approach. The modifications comprise one or more of: the optional designation of a third party public key that will provide a reward to the proof-of-work system for sharing a specific ledger entry, the return of a notification, rather than a transaction remainder in a traditional blockchain system, inserted into the chain, at the request of the optional third party, an optional designation of a third party public key that will provide a reward to the proof-of-work system for the sharing of a specific ledger entry, the return of a notification rather than a transaction remainder, inserted into the blockchain, at the request of the optional third party, and use of a third party public key to decrypt notifications from the third party.

The instant approach supports secure delivery of ledger data and/or metadata to a third party. The data/metadata may be a subset of the entirety of the ledger entry. In the instant system, in one embodiment, the data/metadata of a ledger transaction is sent to a data recording party or other target party. In exchange for sending all or part of a ledger entry to a third party, an originating party agrees to receive, in the ledger transaction, some return data/metadata or notification. The notification is a modification to the ledger and blockchain system that enables a third party to send content to the originating party of the ledger transaction. This notification may be used for a variety of purposes, including but not limited to, advertising, reminders, notifications, information, etc. The originating party devices may optionally display such notifications once the ledger entry is entered as part of the blockchain.

The instant approach can be used in a service that offers blockchain transactions. For example, in the area of automobile records, ledger entries may be triggered every number of miles (for example, every 1000 miles), every time the vehicle is serviced, when airbags are deployed, when the vehicle accelerates rapidly, etc. These verified transactions may be used to provide better and more trusted resale information for vehicles to interested parties. As a result, vehicle owners may subscribe to this service so the automobile blockchain service can increase the value of their vehicle when they wish to sell or trade-in the car. However, if owners are charged for each transaction or for the service, they may not want to participate. To increase the likelihood of participation, a third party advertisement service may offer to pay the blockchain reward for the originating party in exchange for being able to provide notifications to the originating party. For example, if an odometer reaches a specific number and service has not been recorded in the blockchain for a certain number of miles, the third party may trigger an advertisement sent to the originating party for vehicle service or tires or other targeted advertising. This type of notification and advertisement may be valuable because it is known that the originating party needs this service and the originating party is incentivized to receive this service to provide a blockchain service entry which may increase the value of the vehicle.

Figure 3A:
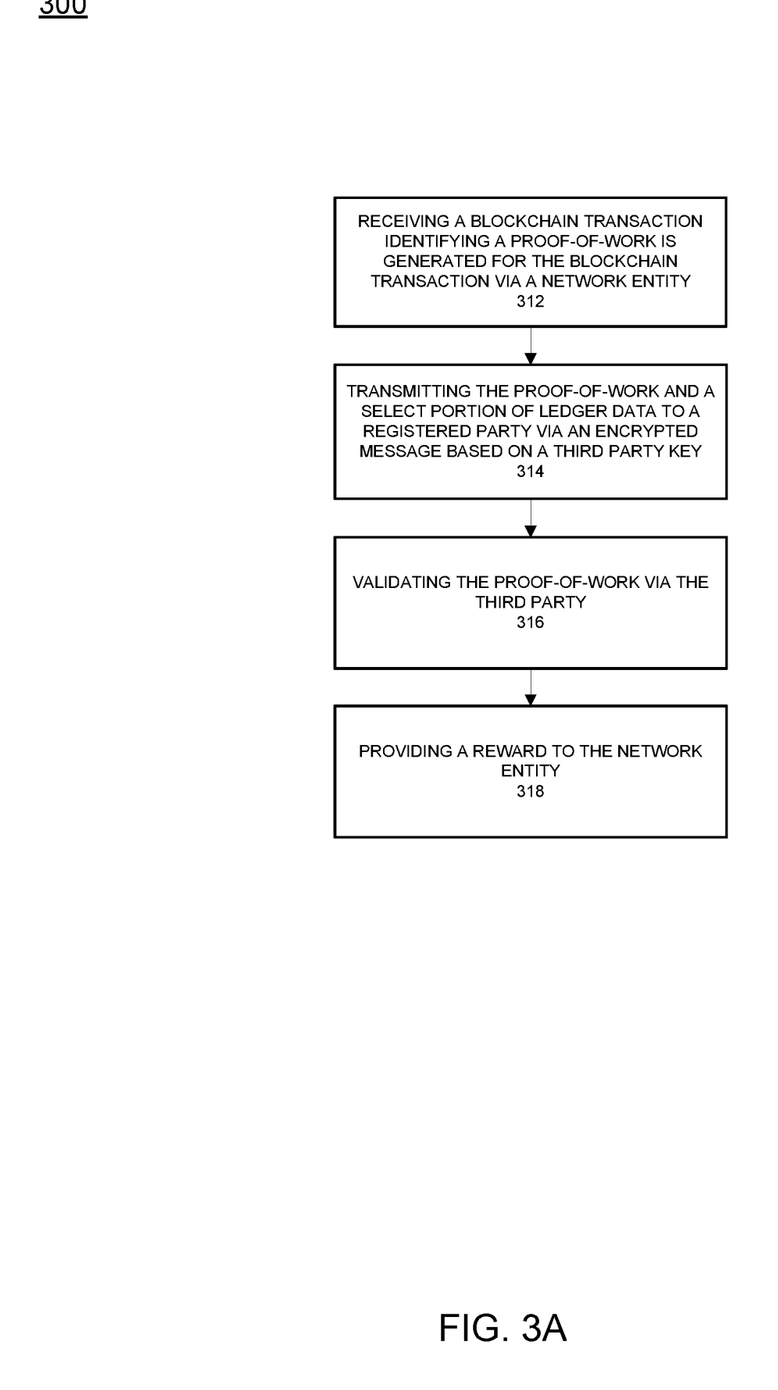
FIG. 3A illustrates a flow diagram of an example method of operation according to example embodiments.

FIG. 3A illustrates a flow diagram of an example method of operation according to example embodiments. Referring to FIG. 3A, the method 300 may comprise one or more of receiving a blockchain transaction identifying a proof-of-work is generated for the blockchain transaction via a network entity 312, transmitting the proof-of-work and a select portion of ledger data to a registered third party via an encrypted message based on a third party key 314, validating the proof-of-work via the third party 316 and providing a reward to the network entity 318. The reward is based on a proof-of-work performed by the network entity. The method may also include transmitting a notification to an originating party of the blockchain transaction. The proof-of-work omits the return notification to the originating party and includes an indicator to forward the third party a select portion of the blockchain transaction. The method may also include receiving a return notification indicating the select portion of the ledger data and an indication that payment will be provided for updating the blockchain with the proof-of-work. The return notification is encrypted with the originating party's public key. The method may also include amending the ledger entry in the blockchain with the return notification.

Figure 3B:
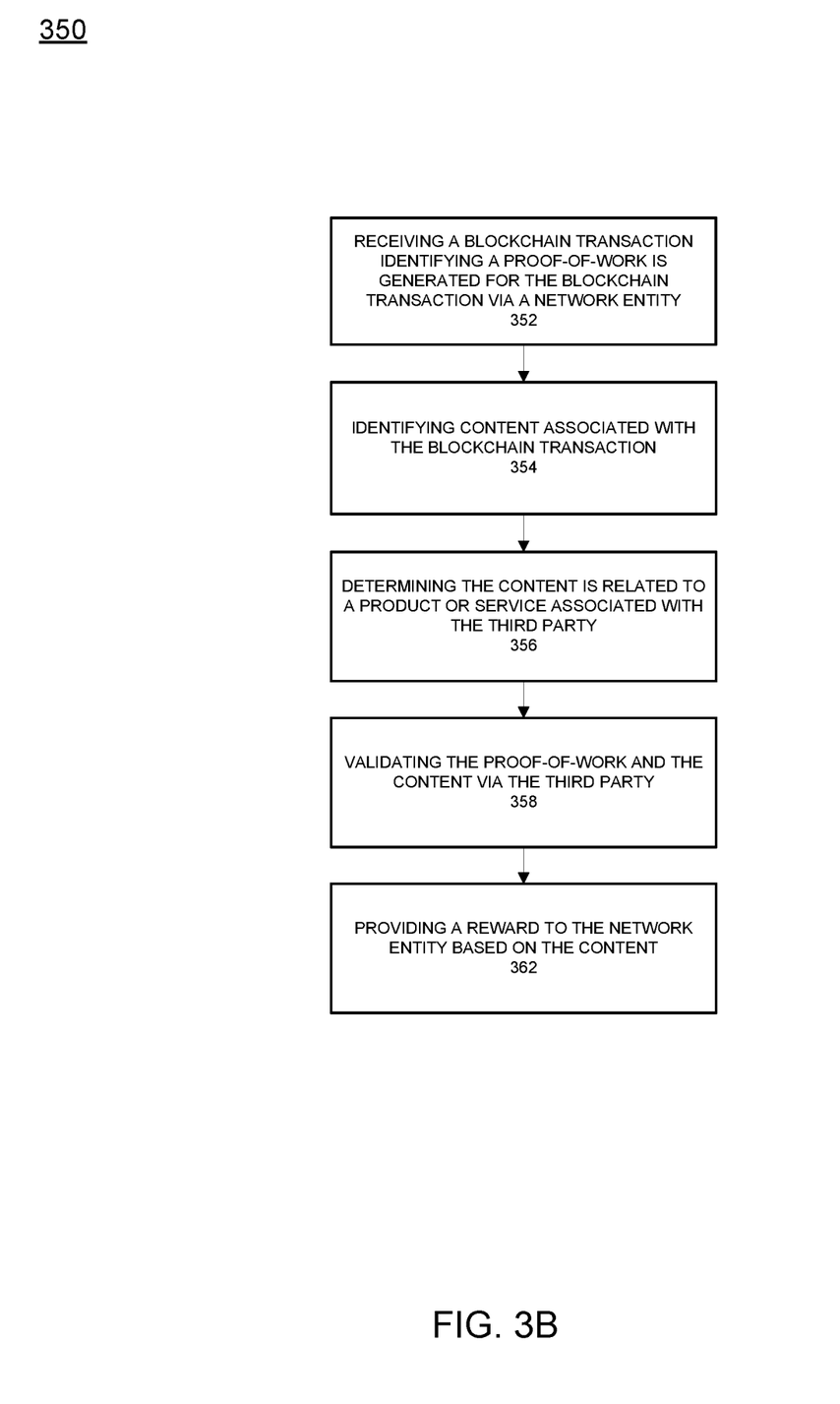
FIG. 3B illustrates a flow diagram of an example method of operation according to example embodiments.

FIG. 3B illustrates a flow diagram of an example method of operation according to example embodiments. In this example, the method 350 comprises one or more of receiving a blockchain transaction identifying a proof-of-work is generated for the blockchain transaction via a network entity 352, identifying content associated with the blockchain transaction 354, determining the content is related to a product or service associated with the third party 356, validating the proof-of-work and the content via the third party 358, and providing a reward to the network entity based on the content 362. In this example, the content of the transaction is used to identify a product or service which may be affiliated with one or more registered third parties. The content may be matched to a registered third party that is interested in sponsoring the transaction based on the content. The third party is then assigned to the transaction based on the content and may be a sponsor of the proof-of-work reward to the transaction and may have a notification, URL, advertisement, etc. to include in a return transaction once the parties to the transaction are identified.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
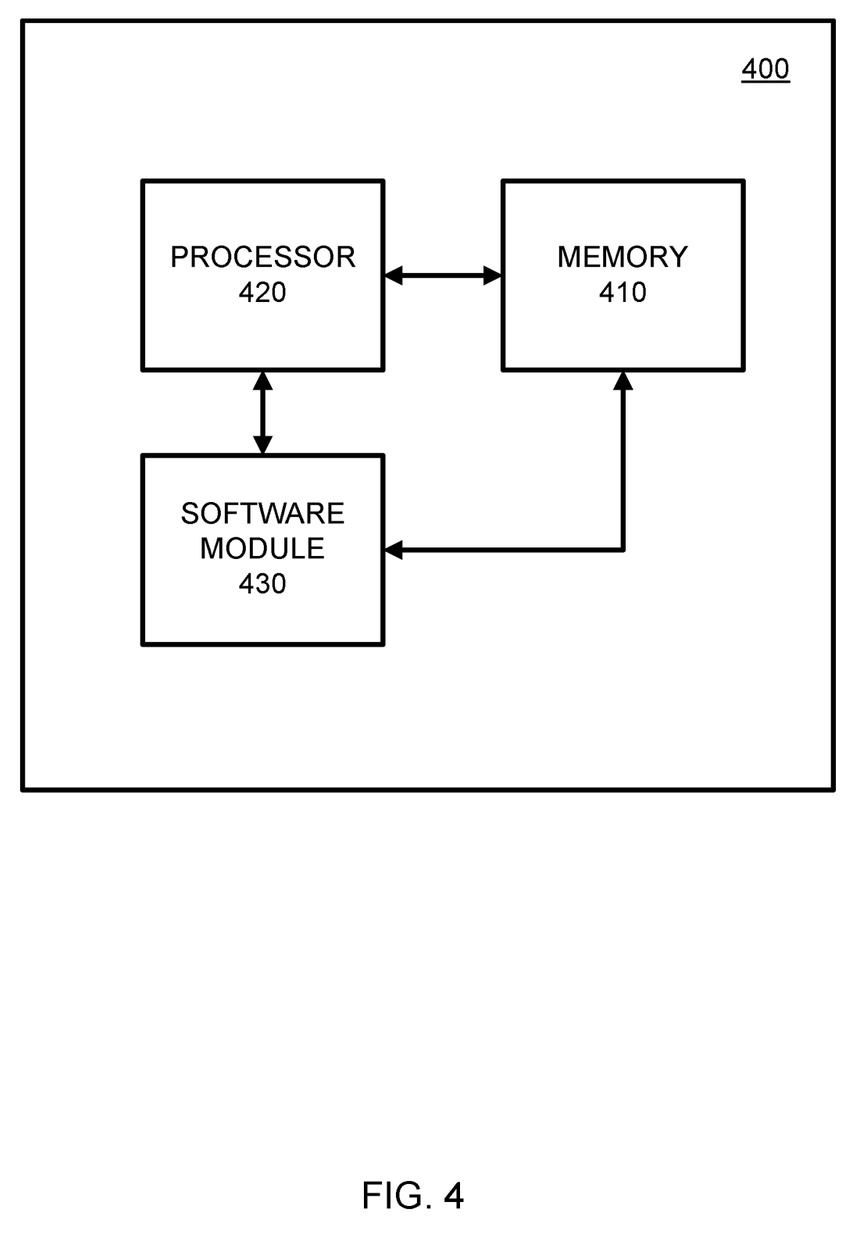
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    receiving a blockchain transaction from an originating party;
    identifying a third-party advertising service to sponsor the blockchain transaction based on content included in the blockchain transaction;
    executing a series of steps to solve a cryptographic puzzle while mining the blockchain transaction to a blockchain ledger of a blockchain network;
    creating a proof-of-work of the steps executed to solve the cryptographic puzzle, wherein the proof-of-work identifies the third-party advertising service for issuing a reward;
    transmitting the proof-of-work of the steps executed to solve the cryptographic puzzle and a portion of the blockchain ledger data of the mining operation to the third-party advertising service via an encrypted message;
    receiving, from the third-party advertising service, a notification indicating that the third-party advertising service will pay the reward once the blockchain transaction has been successfully added to the blockchain ledger, wherein the notification is signed based on a third-party public key assigned to the third-party advertising service by the blockchain network;
    validating the notification based on the third-party public key;
    storing a block including the blockchain transaction and the validated notification from the third-party advertising service on the blockchain ledger; and
    displaying the notification via a display device of the originating party after the blockchain transaction is stored on the blockchain ledger.

2. The method of claim 1, wherein the reward is based on the proof-of-work performed.

3. The method of claim 1, wherein the proof-of-work comprises proof of attempts to solve the cryptographic puzzle.

4. The method of claim 1, further comprising amending a ledger entry in the blockchain ledger with the notification.

5. The method of claim 1, further comprising storing, on the blockchain ledger, advertising content provided by the third-party advertising service while mining the blockchain transaction.

6. An apparatus, comprising:
    a receiver configured to receive a blockchain transaction from an originating party; and
    a processor configured to:
        identify a third-party advertising service to sponsor the blockchain transaction based on content included in the blockchain transaction;
        execute a series of steps to solve a cryptographic puzzle while mining the blockchain transaction to a blockchain ledger of a blockchain network;
        create a proof-of-work of the steps executed to solve the cryptographic puzzle, wherein the proof-of-work identifies the third-party advertising service for issuing a reward;
        transmit the proof-of-work of the steps executed to solve the cryptographic puzzle and a portion of the blockchain ledger data of the mining operation to the third-party advertising service via an encrypted message;

receive, from the third-party advertising service, a notification indicating that the third-party advertising service will pay the reward once the blockchain transaction has been successfully added to the blockchain ledger, wherein the notification is signed based on a third-party public key assigned to the third-party advertising service by the blockchain network;

validate the notification based on the third-party public key;

store a block including the blockchain transaction and the validated notification from the third-party advertising service on the blockchain ledger; and display the notification via a display device of the originating party after the blockchain transaction is stored on the blockchain ledger.

7. The apparatus of claim 6, wherein the reward is based on the proof-of-work performed.

8. The apparatus of claim 6, wherein the proof-of-work comprises proof of attempts to solve the cryptographic puzzle.

9. A non-transitory computer readable storage medium configured to store instructions that when executed cause a processor to perform:

receiving a blockchain transaction from an originating party;

identifying a third-party advertising service to sponsor the blockchain transaction based on content included in the blockchain transaction;

executing a series of steps to solve a cryptographic puzzle while mining the blockchain transaction to a blockchain ledger of a blockchain network;

creating a proof-of-work of the steps executed to solve the cryptographic puzzle, wherein the proof-of-work identifies the third-party advertising service for issuing a reward;

transmitting the proof-of-work of the steps executed to solve the cryptographic puzzle and a portion of blockchain ledger data of the mining operation to the third-party advertising service via an encrypted message;

receiving, from the third-party advertising service, a notification indicating that the third-party advertising service will pay the reward once the blockchain transaction has been successfully added to the blockchain ledger, wherein the notification is signed with a third-party public key assigned to the third-party advertising service by the blockchain network;

validating the notification based on the third-party public key;

storing a block including the blockchain transaction and the notification from the third-party advertising service on the blockchain ledger; and displaying the notification via a display device of the originating party after the blockchain transaction is stored on the blockchain ledger.

10. The non-transitory computer readable storage medium of claim 9, wherein the reward is based on the proof-of-work performed.

11. The non-transitory computer readable storage medium of claim 9, wherein the proof-of-work comprises proof of attempts to solve the cryptographic puzzle.

\* \* \* \* \*